United States Patent Office 3,249,218
Patented May 3, 1966

3,249,218
FLEXIBLE WRAPPER
Howard Curler and Glenn E. Lineburg, New London, Wis., assignors, by mesne assignments, to Curwood, Inc., a corporation of Delaware
No Drawing. Filed June 25, 1963, Ser. No. 290,324
4 Claims. (Cl. 206—84)

This invention relates to a flexible, heat-sealable wrapping material, which is characterized by having an interior layer of polyethylene, which is resistant to degradation and separation from the adjacent layer of the construction, as a result of contact with fats, oils, or other incipient solvents.

In the manufacture of flexible, heat-sealable wrapping materials, it has become common practice in the industry, to use for the interior layer of the wrapper, a film of polyethylene, applied either by direct extrusion coating, or by means of extrusion lamination of a preformed polyethylene film, in combination with another substrate, or carrying sheet, of suitable properties for the packaging application. The substrate is usually of higher melting point than the polyethylene, to give stability to the wrapper when in contact with heat-sealing elements used to heat the polyethylene layer to the fusion point for fabrication and closure of the package. The good heat-sealing properties, and utility of polyethylene for this type of use are well known.

Polyethylene is well suited, because of its hydrophobic nature, and low permeability to water vapor, for use in wrapping materials for the protection of dry products against moisture gain, and also in contact with products containing water, for protection against moisture loss. Its use has also been extended, however, to include applications involving contact with fats, oils, and other organic, substances which are more compatible with polyethylene, and may cause some degree of swelling and degradation of its film strength. Although such substances are not actually solvents for polyethylene, they show an effect which simulates solvent action, and which may be due to partial solution of the lower molecular weight fractions of the polymer. Substances having this effect on polyethylene, of causing swelling, and loss of film strength, we shall refer to as "incipient solvents."

When the polyethylene layer is attacked in this manner, a further effect which almost invariably occurs, is that the interface between the polyethylene and the substrate is also attacked, so that the forces binding the two layers together are weakened, and the polyethylene tends to separate from the substrate. Such separation results in loss of protection of the wrapper and failure of the package.

There has long been a demand for a more satisfactory means of supporting a polyethylene layer, in such a way that it would not be subject to the above type of attack by incipient solvents, which results in loss of its unified relationship to the rest of the wrapper components. Various treatments and prime coatings have been employed to improve the degree of anchorage of polyethylene to many different substrates. Experience has shown that each different interface presents a new problem, and the solution may also vary with the application and method of use of the wrapper. Where contact with fats, oils, and similar substances is involved, it has been almost impossible to find means of joining polyethylene to desired substrates, without various objectionable concomitants. The degree of transparency, or the flexibility of the wrapper may be impaired, or the strength of the bond may not be adequate for the intended use.

We have found a general solution to the problem of providing a permanently unified wrapper (i.e., one which does not delaminate under ordinary conditions of use) which may comprise a wide variety of laminate components, but which has as the interior of the wrapper, a layer of polyethylene supported in such a way as to remain impervious to the attack and separating effect of fats, oils, and other incipient solvents. This consists in supporting the polyethylene on a specially prepared film of a polycarbonate resin, of the type obtained from the reaction of bisphenol A with phosgene. The resulting polymer can be considered an ester of carbonic acid and bisphenol A. A film of this type is available under the trade name "Lexan," made by the General Electric Co. This resin forms a film which is characterized by unusual dimensional stability, due to very low water absorption and low deformation under load, exceptionally high impact strength, good thermal stability, and high transparency. This polycarbonate film, when appropriately bonded with polyethylene to provide a stable unified structure, as hereinafter described, retains this character, even after prolonged contact with incipient solvents, including exposure to these materials under the accentuating effect of elevated temperatures. This unified structure of polycarbonate and polyethylene films may be used by itself, as a wrapping material, or it may be combined with other films and sheets, as hereinafter described, to provide other selected sets of properties. If united with other films or sheets, there is no great difficulty in joining the outer polycarbonate layer to the other films or sheets, because this interface is protected from the action of substances from the packaged material, by the barrier properties of the polycarbonate.

In view of the long history of failure, in the effort to obtain the above degree of oil-resistant anchorage of polyethylene to various carrying sheets, the excellent result using the system provided by this invention, is a most surprising and fortuitous development. In order to obtain unification of these films, it is necessary to prepare the surface of the polycarbonate, by suitable means, before application of the polyethylene. Useful for this purpose are such anchoring agents as the titanate esters, and polyethylene imine. The latter material is preferred, because of ease of use, and the excellence of the bond obtained. Treatment of the surface of the polycarbonate film by means of high voltage corona discharge is also useful in promoting adhesion, particularly when followed by a coating of an anchoring agent such as described above.

The anchoring system, which is used to provide the unified structure that is resistant to oils, greases and incipient solvents, provides quite an unexpected phenomenon. For example, if one uses, as anchoring agents, the titanate esters or polyethylene imine between polyethylene film and Mylar (a polyester film produced by E. I. du Pont de Nemours & Co., Inc.), the bond is readily disruptable and subject to attack by incipient solvents. The same is true with many other known substrates which are commonly used in packaging material in combination with a polyethylene interior film. Equally surprising is the fact that certain commercially available epoxy anchoring agents, which would normally be expected to provide bonds between polyethylene and other substrates which are resistant to oils, greases and incipient solvents, do not have this property even when bonding polyethylene to Lexan. The phenomena that we have discovered is that Lexan and polyethylene may be unified in a manner which is fully resistant to oils, greases and incipient solvents and thereby furnishes an answer to a problem which has plagued the flexible wrapper field for a long period of time.

The polyethylene may be applied to this prepared surface of the polycarbonate by direct extrusion coating, or by extrusion lamination of a preformed polyethylene film.

Where this unified polycarbonate-polyethylene structure is to be further combined with other sheets, to obtain selected properties, this may be done by any suitable means, including extrusion lamination with polyethylene. For additional strength, with freedom from thermoplasticity, a film of cellophane may be used as the exterior sheet. To give additional barrier to water vapor and gases, a Saran-coated grade of cellophane may be selected. To preserve both transparency and thermoplasticity, the combining sheet could be oriented polypropylene. For extremely low permeability to both water vapor and gases, we have found that the exterior sheet is desirably a film of "Aclar," a fluorohalocarbon resin made by Allied Chemical Corp., and having superlative barrier properties, as well as good toughness, transparency, and both high and low temperature utility.

The use of a polycarbonate film as a supporting means for the polyethylene gives versatility in several ways, in the use of this construction. Since the polycarbonate is much higher in melting point than the polyethylene, the heat-sealing operation is not critical, and "burn through" from excessively hot sealing elements is easily avoided. The polycarbonate film has excellent transparency, hence this combination can be used where transparency of the wrapper must be preserved. At elevated temperatures, above about 300° F., the polycarbonate becomes plastic, therefore this construction can be used in thermoforming operations, where it is desired to deep draw the film for cavity type packaging applications.

The following specific examples are intended to illustrate, but not to limit possible means of practicing this invention:

(1) A film of 100 gauge Lexan was coated on one side with a dilute solution of a titanate ester, under anhydrous conditions. After removal of the solvent, this coated surface was extrusion coated with 30 pounds, per 3000 square feet, of polyethylene, grade MPE 70 from Monsanto Chemical Co., and having a density of 0.918, and a melt index of 5.

(2) A film of 100 gauge Lexan, was treated on one side by means of a high voltage corona discharge. The treated side of the film was then extrusion coated with 30 pounds, per 3000 square feet, of polyethylene, grade 205–15 from United States Industrial Chemical Co., and having a density of 0.924, and a melt index of 3.

(3) A film of 100 gauge Lexan was treated on one side by means of a high voltage corona discharge. This side was then coated with a dilute solution of a titanate ester, under anhydrous conditions. After removal of the solvent, this coated surface was extrusion coated with 30 pounds, per 3000 square feet, of polyethylene, grade 205–15 from United States Industrial Chemical Co.

(4) A film of 100 gauge Lexan was coated on one side with a dilute solution of polyethylene imine, and the solvent removed. This coated surface was then extrusion coated with 30 pounds, per 3000 square feet, of polyethylene, grade 205–15 from United States Industrial Chemical Co.

(5) A film of 100 gauge Lexan was treated on one side by means of a high voltage corona discharge. This side was then coated with a dilute solution of polyethylene imine, and the solvent removed. This treated and coated side was then extrusion coated with 30 pounds, per 3000 square feet, of polyethylene, grade 205–15 from United States Industrial Chemical Co.

(6) A film of 50 gauge Aclar, grade 33C, was first treated on one side by means of a high voltage corona discharge, and then coated on the treated side with a dilute solution of polyethylene imine, and the solvent removed. This film was then extrusion laminated on the treated and coated side, with 7 pounds, per 3000 square feet, of polyethylene, grade 205–15 from United States Industrial Chemical Co., to a 100 gauge film of Lexan, the latter having been previously treated by means of a high voltage corona discharge on the side facing the Aclar. This lamination was then treated on the Lexan side by corona discharge, and this surface then coated with a dilute solution of polyethylene imine, and the solvent removed. This lamination was then extrusion laminated on this treated and coated side, with 7 pounds, per 3000 square feet, of polyethylene, grade 205–15 from United States Industrial Chemical Co., to the corona treated side of a 150 gauge film of polyethylene, grade 150A 302 from Du Pont.

The wrappers from the above examples were tested by forming into small pouches, and used for the packaging of a small amount of a lightweight lubricating oil. The sealed pouches were held at a temperature of 160° F. for 48 hours. All pouches remained intact and free from leaks. When the interior layer of polyethylene was inspected, it was found to be intact, and still tightly adhered to the Lexan supporting film. In each case, the wrapper had retained its unified character, so that its protective properties were preserved. Furthermore, where anchoring agents were used, the wrappers appear to maintain this unified character for an indefinite time, even at 160° F.

Considering previous experience with constructions tested for this type of use, this is a new and unexpected result. No substrate has been found which would maintain adhesion to polyethylene under these severe conditions. It is also surprising to find that the use of polyethylene imine, or a titanate ester, as anchoring agents, produce this result, inasmuch as these materials are ineffective in giving an oil-resistant bond of polyethylene to other substrates, even when applied to a corona treated surface.

The wrapper from Example 6 illustrates how this invention may be used for the construction of combinations of materials having selected properties required for specific packaging application. This wrapper is designed to have a very low permeability to water vapor and gases, to be very transparent, to have good strength for demanding use, and to retain its unified character and protective properties even after being in contact with fats and oils from the packaged material. With the wrapper of this example, these properties are obtained with a construction which is only about 0.004 inch thick. The wrapper therefore has good flexibility for package formation, and is thin enough to give rapid transmission of heat, so that it will function well on normal, available heat-sealing devices. Wrappers previously tried for this type of service gave inferior results due to having a total thickness about twice this value, which reduced transparency and interfered with flexibility and ease of heat sealing. In the wrapper from this example, all components of the construction are thermoplastic, hence this wrapper may be thermoformed, if desired, for cavity type packaging use.

A wrapper of the above type is useful in the packaging of oiled metal parts, sutures, biological preparations and other materials requiring high temperature sterilization, fatty food products, including prepared foods designed to be heated in the package. In uses where a less protective, and less expensive wrapper is required, other materials may be used for the exterior of the wrapper in place of Aclar, as previously discussed. The unified interior layer, consisting of polyethylene, supported on the polycarbonate layer, still provides the functional properties and resistance to incipient solvents, characteristic of this structure.

We claim:
1. A flexible wrapping material which has successive layers of a fluorohalocarbon resin, a polycarbonate resin and polyethylene, said successive layers being bonded together to provide a unified structure, and means for anchoring the polyethylene to the polycarbonate resin to provide a bond therebetween which is resistant to the action of oils, greases and incipient solvents applied to the exposed face of the polyethylene.

2. An hermetically sealed package comprising transparent wrapping material having an interior polyethylene film forming the seal for the package, the package containing a product which includes an oil, grease, or incipient solvent, and the wrapping material having a substrate adjoining the polyethylene inner face which is composed of a polycarbonate resin and is anchored to the polyethylene inner face to provide a unified material.

3. An hermetically sealed package containing a product which includes oil, grease or incipient solvent material, said package comprising flexible wrapping material in the form of a unified laminate which includes an interior layer of polyethylene supported on a substrate of polycarbonate resin, and means for anchoring the polyethylene to the polycarbonate resin to make the bond therebetween resistant to oils, greases and incipient solvents.

4. A flexible wrapping material which has successive layers of a fluorohalocarbon resin, a polycarbonate resin, and polyethylene, the fluorohalocarbon resin and polycarbonate resin being treated with corona discharge on their mating faces and anchored with an anchoring agent, and the polycarbonate resin and polyethylene being both treated on their mating faces with corona discharge and then bonded together with an anchoring agent.

References Cited by the Examiner

UNITED STATES PATENTS

| | | | |
|---|---|---|---|
| 143,771 | 10/1873 | Lumb | 206—84 |
| 378,325 | 2/1888 | Leonard | 206—84 |
| 2,788,306 | 4/1957 | Cox et al. | |
| 2,828,237 | 3/1958 | Rosser. | |
| 2,940,889 | 6/1960 | Justice | 161—247 |
| 2,945,773 | 7/1960 | Panagrossi et al. | |
| 3,017,282 | 1/1962 | Brill. | |
| 3,080,266 | 3/1963 | Haslam. | |
| 3,081,214 | 3/1963 | Strome | 156—272 |
| 3,090,717 | 5/1963 | Raczynski et al. | 156—272 |

FOREIGN PATENTS

| | | |
|---|---|---|
| 209,644 | 8/1957 | Australia. |
| 234,498 | 7/1961 | Australia. |

THERON E. CONDON, *Primary Examiner.*

GEORGE O. RALSTON, J. M. CASKIE,
*Assistant Examiners.*